Figure 1:
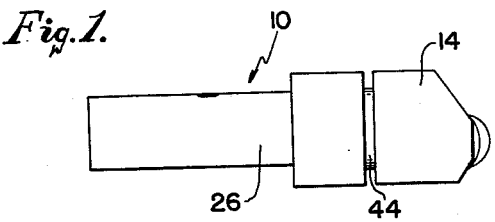

Dec. 8, 1964    C. K. JUDD, JR    3,160,043
SELF-ALIGNING PILLAR POSTS FOR GLASS CUTTING WHEELS
Filed Nov. 2, 1962

INVENTOR.
CHESTER K. JUDD Jr.

BY *Zellers, McCormick, Paulding & Huber*
ATTORNEYS

United States Patent Office 3,160,043
Patented Dec. 8, 1964

3,160,043
SELF-ALIGNING PILLAR POSTS FOR GLASS
CUTTING WHEELS
Chester K. Judd, Jr., Bristol, Conn., assignor to The
Fletcher-Terry Company, Forestville, Conn., a corporation of Connecticut
Filed Nov. 2, 1962, Ser. No. 235,035
7 Claims. (Cl. 83—12)

This invention relates to glass cutting devices and is particularly directed to a self-aligning pillar post type of holder for a glass cutting wheel for use in glass cutting machines.

Pillar posts are generally provided in a variety of different sizes and shapes to meet the requirements of glass cutting machines and generally comprise a bifurcated head portion adapted to receive and hold a glass cutting wheel in a work engaging position with an elongated stem extending therefrom for mounting the assembly to a glass cutting machine. Pillar posts for glass cutting wheels are also provided in which the stem and wheel receiving head are adapted for limited rotation to permit rotative movement of the wheel as it is drawn across the surface of the glass to be cut. Such limited caster or swiveling is desirable since the wheel is therefore at all times in proper alignment with respect to the direction of travel of the holder over the glass permitting a continuous, uninterrupted cutting line to be scribed in the surface thereof.

A common disadvantage of the swivel type pillar posts presently in use, however, has been experienced by glass manufacturers in trimming and sizing large glass sheets. In order to prevent rough or "hooked" corners on trimmed sheets, the edge of the glass cutting wheel must, on initial contact, meet the glass so that it is aligned with the direction of travel of the wheel thereacross. While the pillar post is normally positioned in the glass cutting machine to permit the wheel to engage the work with its cutting edge perpendicular to the surface thereof, the caster or swiveling action of the posts presently in use is not self-aligning to prevent the cutting wheel's being angularly disposed to the direction of the cut upon initial contact with the glass. Sharp "hooks" or other irregularities on the corners of the sheets are, therefore, a common occurrence. A primary object of the present invention is to provide a pillar post for a glass cutting wheel provided with aligning means whereby upon initial contact with the glass sheet, the cutting wheel will be disposed in operative position, aligned with the direction of travel of the wheel over the surface of the glass.

Still another object of the present invention is to provide a pillar post for a glass cutting wheel which will permit limited rotative movement of the cutting wheel during the glass cutting operation but which will, upon completion thereof, automatically align the cutting wheel in the direction of travel thereof over the surface of the glass, preparatory to the next cutting operation.

Still another object of this invention is to provide a pillar post which is simple and inexpensive to manufacture and which is adaptable for use with a variety of glass cutting machines.

Other objects and advantages of the present invention will become more readily apparent from the following description and following drawing which shows a preferred embodiment of the invention, and such embodiment will be described; but it will be understood that various changes and modifications may be made from the construction disclosed, and that the drawing and description are not to be construed as defining or limiting the scope of the invention, the claims forming a part of this specification being relied upon for that purpose.

Figure 2:
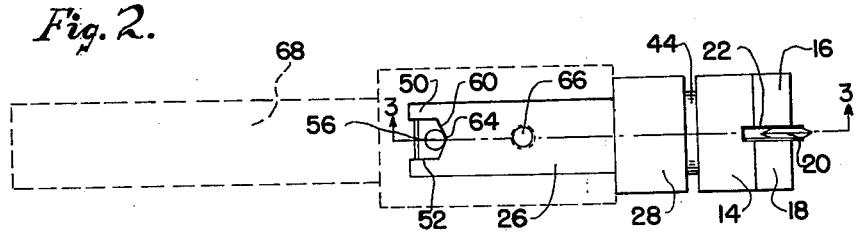
Figure 4:
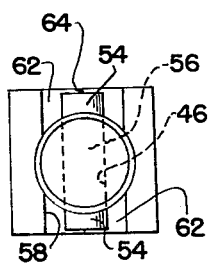
Figure 3:
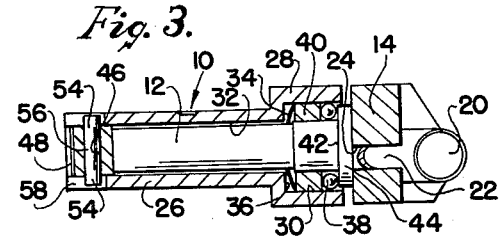
Figure 5:
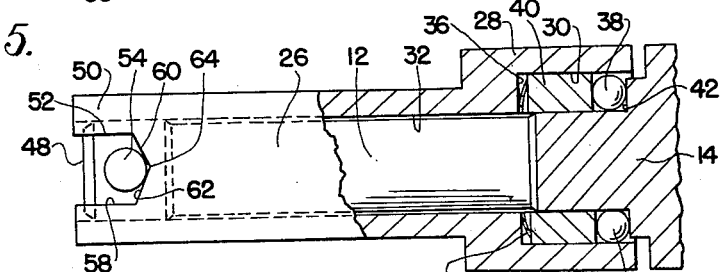
Figure 6:
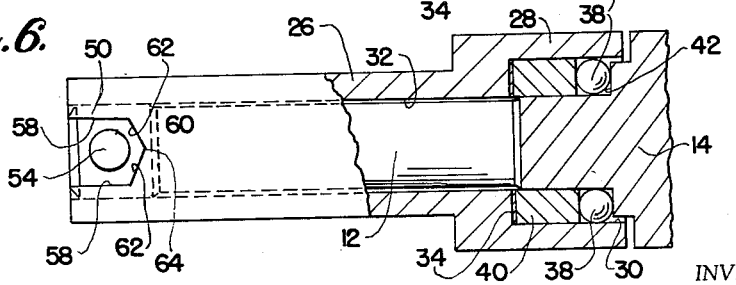

In the drawing:
FIG. 1 is an elevational side view of a pillar post for a glass cutting wheel embodying the present invention;
FIG. 2 is a plan view thereof illustrated with a pillar post adaptor shown in broken lines;
FIG. 3 is a sectional view taken substantially on line 3—3 of FIG. 2, with parts thereof shown in elevation;
FIG. 4 is an enlarged end view illustrating certain novel features of the present invention;
FIG. 5 is an enlarged, horizontal sectional view with parts shown in elevation showing the relative positions of the stem and sleeve of the present invention when the cutting wheel is in self-aligning position; and
FIG. 6 is a view similar to FIG. 5 but showing the stem and sleeve when the cutting wheel is in swiveling or rotatable position.

The numeral 10 indicates generally a preferred embodiment of the self-aligning pillar post of the present invention which includes an elongated, cylindrical stem 12 provided with an enlarged head portion 14 on one end thereof and preferably formed intergrally with the stem. The head 14 is bifurcated as shown in FIG. 2 to form furcations 16 and 18 which are adapted to receive and hold a removable glass cutting wheel 20 therebetween in operative position for engaging the surface of a sheet of glass. While the wheel 20, as shown, is secured within the head 14 by means of a wheel retainer 22 positioned within an axial bore 24 therein it is to be understood that any conventional means may be employed to receive and retain the wheel in operative position within the head.

The stem 12 is removably received within a sleeve 26 for limited rotative and longitudinal sliding movement therein. An enlarged end portion 28 provided on the sleeve adjacent to the head portion 14 is formed with an enlarged diameter bore 30 therein coaxial with, and forming an extension of, the axial bore 32 of the sleeve. A Bellville or spring washer 34 surrounding the stem 12 is positioned within the enlarged bore against a shoulder 36 formed therein. A circular row of ball bearing 38 likewise surrounds the stem 12 within the bore 30, as shown, and is retained in spaced apart relation from the spring washer 34 by a spacer ring 40 surrounding the stem between the spring and the bearings. The ball bearings 38, spacer 40 and spring washer 34 are retained in operative position within the bore 30 surrounding the stem 12 by a shoulder 42 formed on the stem by an angular flange 44 contiguous with the end of the stem adjacent to the head portion 14 as shown. It can be seen in FIGS. 5 and 6 that the diameter of the stem through the flange 44 is less than the internal diameter of the bore 30 whereby the flange may be received within the bore to permit axial movement of the stem 12 within the sleeve 26.

A transverse bore 46 is provided in the stem 12, preferably located inwardly of the end 48 and extends through the stem in a direction normal to the central longitudinal axis thereof. The corresponding free end portion 50 of the sleeve 26 is bifurcated to form diametrically opposed identical slots 52, 52 to receive projecting ends 54, 54 of a roll pin 56 disposed within the bore 46. Each of the slots 52, 52 is defined by opposed, axially extending, parallel side walls 58, 58 and terminates in a V-shaped seat 60 formed by transversely extending, converging end walls 62, 62 which extend between the sides 58, 58 and interesect on a line bisecting the said slots as at 64. The width of the slots 52, 52 is greater than the diameter of the projecting ends of the pin 56 to permit limited rotative movement of the stem 12 within the sleeve 26, the degree of rotation being limited by engagement of the ends 54, 54 with the side walls of the slots. It is therefore readily apparent that a predetermined degree of caster or swiveling action of the cutting wheel 20 may be obtained by providing slots of predetermined width relative to the diameter of the ends of the pin 56. It is also apparent to those skilled in the art that the biasing force of the spring washer 34 urges the stem axially outwardly of the enlarged end portion 28 of the sleeve 26. The outward movement is restricted, however, by engagement of the projecting ends 54, 54 with the end walls 62 of the V-shaped seats 60, 60. It will be noted that the bias of the spring washer also urges the ends of the pin to center in the slots, being normally disposed within the V-shaped seats, whereby the stem 12, head 14 and cutting wheel 20 are rotated into a predetermined, rotated position with respect to the sleeve 26.

A recess 66 is provided in the wall of the sleeve 26, intermediate the ends thereof, for receiving the end of a set screw (not shown) carried by the glass cutting machine or a pillar post adaptor 68, shown in broken lines in FIG. 2, by means of which the pillar post may be secured in a glass cutting machine in operative position with the edge of the glass cutting wheel 20 aligned with its direction of travel over the surface of the glass to be cut.

In the glass cutting operation, the wheel 20 is brought into engagement with the surface of the glass and drawn thereacross along a predetermined course. As normal cutting pressure is exerted upon the wheel, the bias of the spring washer 34 is overcome, permitting the stem to slide axially inwardly within the sleeve 26 to the position shown in FIG. 6 whereby the ends 54, 54 of the pin 56 are moved axially out of their normal position within the V-shaped seats. It will be noted that the biasing force of the spring washer is such that only normal cutting pressure on the cutting wheel is necessary to overcome the bias of the spring 34. With the pin disposed in the slot as shown in FIG. 6, the stem and cutting wheel carried thereby are free to rotate within the sleeve 26, the degree of rotation in either direction being limited by engagement of the ends 54, 54 with the side walls of the slots. As stated previously, the extent of rotation may be predetermined by controlling the diameter of the ends 54, 54 with respect to the width of the slots.

Those skilled in the art will readily understand that the "swivel" or caster thereby provided permits the cutting wheel to adjust to the slight lateral movements of the head as it travels across the surface of the glass thus avoiding the lateral "skidding" often encountered when using a nonrotatable pillar post having a cutting wheel not adapted to "swivel."

As the cutting wheel passes beyond the edge of the glass upon completion of the cut, cutting pressure is no longer exerted upon the wheel, and the bias of the spring washer again urges the stem and pin outwardly in the direction of the enlarged end 28, seating the projecting ends of the pin 56 centrally in their respective V-shaped seats 60, 60. The cutting wheel is automatically and rotatively aligned with the direction of travel of the glass cutting machine preparatory to making the next cut whereby the wheel will initially engage the edge of the glass sheet aligned with its predetermined direction of travel thereacross. It is therefore apparent that the pin 56 cooperates with the spring 36 and the slots 52, 52 to limit the outward movement of the stem and to align the wheel and head in a predetermined rotated and axial position with respect to the sleeve.

The invention claimed is:

1. A glass cutting wheel pillar post having a cylindrical stem and a wheel-receiving head on one end thereof and including an elongated sleeve adapted to receive said stem for rotative and axial movement therein, a spring member cooperative with said sleeve normally biasing said stem outwardly of the sleeve in the direction of said wheel receiving head and cooperative means on said stem and sleeve restricting such outward movement and coactive with said spring member to align said wheel-receiving head in a predetermined position with respect to said sleeve.

2. A glass cutting wheel pillar post having a cylindrical stem and a wheel receiving head on one end thereof and including an elongated sleeve adapted to receive said stem for rotative and axial sliding movement therein, said sleeve being provided with an opening therein extending through the side of the sleeve to form an abutment surface therein, a spring member surrounding the stem and cooperative with the sleeve normally biasing the stem outwardly of the sleeve in the direction of said wheel receiving head and means carried by the stem and engageable with said abutment surface to restrict outward movement of the stem under influence of the bias of the spring member and to align said wheel-receiving head in a predetermined rotated and axial position with respect to said sleeve.

3. A glass cutting wheel pillar post having a cylindrical stem and a wheel-receiving head on one end thereof and including an elongated sleeve adapted to receive said stem for rotative and axial sliding movement therein, one end of said sleeve being formed with a longitudinal slot therein, said slot being defined by opposed longitudinal surfaces and converging transverse surfaces, said transverse surfaces intersecting to form a V-shaped seat in said slot, a spring member associated with said sleeve and biasing said stem outwardly thereof, and means on said stem engageable with said V-shaped seat restricting said outward movement and cooperating with said spring member to releasably align said wheel-receiving head in a predetermined rotated and axial position with respect to said sleeve.

4. A glass cutting wheel pillar post having a cylindrical stem provided with a wheel-receiving head on one end thereof and a laterally extending projection disposed inwardly from the other end thereof and including an elongated sleeve adapted to receive said stem for rotative and axial sliding movement therein, one end of said sleeve being bifurcated to form diametrically opposed slots therein, each of said slots being defined by opposed longitudinal surfaces and converging transverse surfaces intersecting to form a V-shaped seat therein lying between said opposed longitudinal surfaces, a spring member associated with said sleeve and biasing said stem outwardly thereof in the direction of the head, the said laterally extending projection being adapted to be received in at least one of said slots for engagement with said V-shaped seat to restrict the outward movement of the stem and to coact with said spring member and converging surfaces to rotate said wheel-receiving head into a predetermined, aligned position with respect to said sleeve.

5. A glass cutting wheel pillar post having a cylindrical stem provided with a wheel-receiving head on one end thereof and formed with a transverse bore extending therethrough and disposed inwardly from the other end thereof, the longitudinal axis of said bore being perpendicular to the longitudinal axis of said stem, said pillar post including an elongated sleeve adapted to receive said stem for rotative and axial sliding movement therein, one end of said sleeve being bifurcated to form diametrically opposed slots therein, said slots being defined by opposed longitudinal walls and converging transverse walls, said transverse walls intersecting to form V-shaped seats lying between the longitudinal walls, a spring member associated with said sleeve and biasing said stem outwardly thereof in the direction of the head, an elongated pin disposed within the transverse bore in the stem and having projecting end portions extending outwardly thereof, said end portions being of a diameter less than the width of said slots and adapted to be disposed therein to limit rotative movement of said stem by engagement with said longitudinal walls and to coact with said spring member and converging walls of the V-shaped seat to restrict the outward movement of the stem and to rotate said wheel-receiving head into a predetermined aligned position with respect to said sleeves.

6. The subject matter of claim 1 wherein said cooperative means is responsive to an inwardly directed force on the stem to overcome the bias of said spring permitting limited rotative movement of said stem and head during a glass cutting operation.

7. The subject matter of claim 2 wherein the means carried by the stem is responsive to an inwardly directed force on the stem overcoming the bias of said spring to permit limited rotative movement of said stem and head during a glass cutting operation.

References Cited in the file of this patent

UNITED STATES PATENTS

| | | |
|---|---|---|
| 2,254,413 | Battershell | Sept. 2, 1941 |
| 2,810,960 | Johnson et al. | Oct. 29, 1957 |

FOREIGN PATENTS

| | | |
|---|---|---|
| 155,338 | Great Britain | Dec. 3, 1920 |
| 421,223 | Great Britain | Dec. 17, 1934 |